Patented May 11, 1954

2,678,338

UNITED STATES PATENT OFFICE 2,678,338

PRODUCTION OF CYCLOALKADIENE HYDROCARBONS

Carl B. Linn, Riverside, Ill., assignor to Universal Oil Products Company, Chicago, Ill., a corporation of Delaware No Drawing. Application October 28, 1950, Serial No. 192,825

3 Claims. (Cl. 260—666)

This application is a continuation-in-part of my co-pending application, Serial Number 751,127, filed May 28, 1947, now abandoned This invention relates to a process for producing cycloalkadiene hydrocarbons and particularly for producing a conjugated cyclohexadiene.

An object of this invention is to form a cycloalkadiene hydrocarbon.

Another object of this invention is to form a cyclohexadiene.

Still another object of this invention is to form cyclohexadiene-1,3.

A further object of this invention is to form cyclohexadiene-1,4.

One embodiment of this invention relates to a process for producing cyclohexadiene which comprises reacting a mixture of a cyclohexenone and cyclohexenol in the presence of an aqueous solution of an acid-acting catalyst and recovering the resultant cyclohexadiene.

Another embodiment of this invention relates to a process for producing cyclohexadiene which comprises reacting a mixture of a cyclohexenone and a cyclohexenol in the presence of an aqueous solution of a mineral acid.

A further embodiment of this invention relates to a process for producing cyclohexadiene which comprises reacting a mixture of a cyclohexenone and a cyclohexenol in the presence of an aqueous solution of sulfuric acid.

A still further embodiment of this invention relates to a process for producing cyclohexadiene which comprises reacting a mixture of a cyclohexenone and a cyclohexenol in the presence of an aqueous solution of magnesium chloride.

This invention relates to a process for preparing a cyclohexadiene hydrocarbon from a cyclohexene hydrocarbon by a combination of oxidation and dehydration reactions. This process may be applied to different cyclohexene hydrocarbons including cyclohexene and various alkylated and substituted cyclohexene hydrocarbons having a hydrogen atom combined with each of the doubly bonded carbon atoms.

Cyclohexene and other cyclohexene hydrocarbons which are utilizable as starting materials in this process, are reacted with gaseous oxygen or with a gas containing free oxygen at a temperature of from about 100° to about 225° C. and preferably at a temperature of from about 125° to about 175° C. and at a superatmospheric pressure up to about 100 atmospheres preferably 25 to 75 atmospheres. The resultant oxidation product consists of about 60% of unconverted cyclohexene which is suitable for recycling to the process and 40% of oxygen-containing organic material boiling above 100° C. at atmospheric pressure. This oxygen-containing organic material which comprises essentially cyclohexenone and cyclohexenol when cyclohexene itself is the starting material, may be reacted to form cyclohexadiene. Other cycloalkenes may be oxidized similarly by free oxygen to form cycloalkenones and cycloalkenols. Distillation of the resultant oxygen-containing organic material at atmospheric pressure gives a distillate which contains a mixture of cyclohexadiene isomers boiling from about 78° to about 83° C. and equivalent to from about 20 to about 30% of the weight of the oxygen-containing material treated.

When the oxygen-containing organic material is distilled at a subatmospheric pressure, a mixture of cyclohexenone and cyclohexenol boiling at 155 to 160° C. at 1 atm. pressure is obtained in an amount equivalent to 50–70% by weight of the oxygen-containing organic material. The mixture of cyclohexenone and cyclohexenol is converted into cyclohexadiene-1,3 in almost 100% yield by heating at a temperature of from about 100° to about 200° C. and preferably at 175° C. with a dilute aqueous solution of magnesium chloride. Distillation of the mixture of cyclohexenone and cyclohexenol with dilute sulfuric acid also gave about 100% yield of cyclohexadiene, but in this case, the cyclohexadiene consisted of a mixture of isomers.

According to this process, a cyclohexene hydrocarbon and particularly cyclohexene itself is oxidized either continuously or in batch-type operation at a temperature near 150° C. and a pressure of 1 to 100 atms. Air may be used as the oxidizing agent or a more pure source of oxygen may be employed. It is of importance that the mole ratio of cyclohexene to oxygen exceed 2 and preferably be in the range of 4 to 10. The product obtained from this oxidation treatment is also dependent upon the method used and its recovery. By employing reduced pressure for its distillation, cyclohexenol is the main product but if the distillation is carried out at atmospheric pressure, cyclohexadiene is an important product. The formation of the cyclohexadiene may be influenced by catalysts present in the distillation system such as a material containing water in a fractionating column, or the presence of hydrogen ions due to distillation in the presence of a dilute aqueous solution of a mineral acid or of an acid-acting salt.

The importance of a simple and relatively inexpensive synthesis of cyclohexadiene is apparent, since this material was previously available only by a long chemical synthesis. Cyclohexadiene has great potential use in chemical synthesis as its conjugated unsaturation permits its use in polymerization and condensation reactions leading to the formation of long chain molecules such as those present in rubber, plastics and resins The nature of the present invention and type of results obtained thereby are indicated further by the following examples which should not be misconstrued to limit the broad scope of the invention.

*Example I*

A 3.8 liter rotatable steel autoclave was charged with 400 ml. (325 grams) of cyclohexene, and air was added to a pressure of 35 atms. to give an oxygen charge of approximately 32 grams. The temperature of the autoclave was increased slowly to 145° C. when reaction was evidenced by a slight explosion which caused the self-generated pressure to increase rapidly by several atmospheres. The autoclave was cooled and 90 liters of gas were released which analyzed 96% by volume of nitrogen and contained small amounts of oxygen, carbon monoxide, carbon dioxide and hydrogen. The liquid recovered from the autoclave (340 grams) was distilled at reduced pressure (8 mm.) and separated into the following fraction (B. P. converted to 1 atmos.):

|                                       | Per cent |
|---------------------------------------|----------|
| Unreacted cyclohexene                 | 58.1     |
| Material boiling near 160° [a]        | 20.1     |
| Material boiling near 205° [b]        | 7.0      |
| Adipic acid                           | 1.7      |
| Other liquid products                 | 7.0      |
| Carbon oxides, water and loss         | 6.1      |

[a] Mostly cyclohexenol.
[b] Mostly cyclohexanediol-1,2.

When the product recovered from the autoclave was distilled at atmospheric pressure, less material was obtained boiling at 160° C. probably because more of the oxygen-containing material had been decomposed to cyclohexadiene-1,3 as evidenced by physical constants and formation of an addition product with maleic anhydride.

*Example II*

In another run, a 3.8 liter rotatable steel autoclave was charged with 325 grams of cyclohexene and air was added to a pressure of 35 atms. The autoclave was heated to 150° C. and then cooled. The residual pressure was released without measuring or analyzing the effluent and the resultant liquid product was collected. The liquid products from this run and from 15 other similar runs were blended and distilled. A composite summary was as follows:

Total charge, grams:
  Cyclohexene _____ 5200
  Oxygen (calc.) _____ 574

Total _____ 5774

Total recovery:
  Cyclohexene _____ 3357
  B. P. 150–165* _____ 1047
  Higher boiling point _____ 1023
  Carbon oxides+losses _____ 347

Total _____ 5774

* Corresponds to cyclohexenone+cyclohexenol.

These data show a 35% conversion of cyclohexene, 51% of the reacted cyclohexene was recovered as cyclohexenone and cyclohexenol.

In the rectification of the product, cyclohexene was removed at atmospheric pressure. The blended product was then distilled at a pressure of 16 mm. of mercury and separated into fractions with the following properties:

| Fraction | T° C. | mm. Hg | T° Corr. to 760 mm. | $n_D^{20}$ | Wt., Percent |
|----------|-------|--------|---------------------|------------|--------------|
| 0        | Below 50 | 16 |          |        | 2.3  |
| 1        | 50–60    | 16 |          | 1.4786 | 1.3  |
| 2        | 60–61    | 16 |          | 1.4780 | 2.2  |
| 3        | 61–62.8  | 16 | 154–155  | 1.4816 | 5.4  |
| 4        | 62.8–62.5 | 16 | 155–156 | 1.4853 | 17.3 |
| 5        | 62.5–70  | 16 | 156–159  | 1.4866 | 13.8 |
| 6        | 70–73.5  | 16 |          | 1.4865 | 6.3  |
| 7        | 73.5–80  | 16 |          | 1.4868 | 1.8  |
| 8        | 80–98    | 16 |          | 1.4875 | 2.7  |
| Bottoms  | Above 98 | 16 |          |        | 46.8 |

Cyclohexene oxidizes to give a high yield of material boiling near 160°; this decomposes thermally to give a material boiling near 80° which is cyclohexadiene. A crystalline fraction boiling near 200° is cyclohexane-di-ol,1–2.

In another run a sizable quantity of the cyclohexene oxidation product was prepared as follows:

Under the conditions of reaction (150° C. with a cyclohexene to oxygen molar ratio of 4) 1.35 mols cyclohexene reacted per mole oxygen. On a weight basis, 61% of the product was recycle cyclohexene; 39% (I), was higher boiling than cyclohexene.

(I) was distilled at 1 atmosphere through a Nichrome packed column, taking the overhead temperature to 271° C.; 82% (II), was volatile. Decomposition of (I) was occurring during the distillation as evidenced by erratic overhead temperature. (II) distilled and showed a 22% content of organic material boiling at 79–85° which appeared to be a mixture of 1,3-, and 1,4-cyclohexadiene in about equal amounts. Thus 18% of (I) was recovered as cyclohexadiene.

When (I) was distilled at 8 mm. pressure, 55% (III) boiled near 68° and no decomposition to the diene occurred. When redistilled at 1 atmosphere in a glass system, product (III) boiled near 164°.

(III) was hydrogenated at 42° in presence of a nickel catalyst to give apparently quantitative yield of cyclohexanol.

(III) examined by infrared analysis showed presence of (a) a cyclohexene derivative containing an (OH); (b) a cyclohexene derivative containing a (C=O). (a) and (b) appeared to be present in nearly equal amounts.

(III) was used to prepare a phenylurethan which melted correctly for the corresponding derivative of cyclohexene-1,3-ol.

(III) was treated in an autoclave for 2 hours with an equal volume of aqueous solution, containing 2% of magnesium chloride.

(a) At 100° no cyclohexenol formed; about 50% was unchanged, the rest apparently condensed.

(b) At 175°, 20% of III was converted to cyclohexadiene which ultraviolet analysis indicated to be nearly all the 1,3-isomer.

(I) was treated with a very dilute solution of sulfuric acid (about 1% $H_2SO_4$) and the two-phase system was distilled. 22% of (I) charged was converted and finally recovered as cyclohexadiene, the two isomers in about equal amounts.

I claim as my invention:

1. A process for producing cyclohexadiene which comprises reacting a mixture of a cyclohexenone and a cyclohexenol at a temperature of from about 100° to about 200° C. in the presence of an aqueous solution of an acid-acting catalyst selected from the group consisting of sulfuric acid and magnesium chloride and recovering the resultant cyclohexadiene.

2. A process for producing cyclohexadiene which comprises reacting a mixture of a cyclohexenone and a cyclohexenol at a temperature of from about 100° to about 200° C. in the presence of an aqueous solution of sulfuric acid.

3. A process for producing cyclohexadiene which comprises reacting a mixture of a cyclohexenone and a cyclohexenol at a temperature of from about 100° to about 200° C. in the presence of an aqueous solution of magnesium chloride.

References Cited in the file of this patent

UNITED STATES PATENTS

| Number | Name | Date |
|---|---|---|
| 1,164,647 | Hibbert | Dec. 21, 1915 |
| 2,291,915 | Palmer et al. | Aug. 4, 1942 |
| 2,368,068 | Morey | Jan. 23, 1945 |
| 2,492,956 | Ballard et al. | Jan. 3, 1950 |

OTHER REFERENCES

Journal Chem. Soc. (London), vol. 103 (1913), pp. 1242–1250.